(12) United States Patent
Hilerio et al.

(10) Patent No.: US 12,050,651 B2
(45) Date of Patent: *Jul. 30, 2024

(54) MONITORING EXECUTION OF DOCUMENT WORKFLOWS USING CLOUD PLATFORM INDEPENDENT DOCUMENT WORKFLOW ORCHESTRATION RUNTIME

(71) Applicant: DocuSign, Inc., San Francisco, CA (US)

(72) Inventors: Israel Hilerio, Kenmore, WA (US); Jeffrey Taihana Tuatini, Greenbrae, CA (US); Kyle Bastien, Newcastle, WA (US); Sahitya Gollapudi, Newark, CA (US); Zurka Wolford, Seattle, WA (US); Christian Joshua Mora, Seattle, WA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,635

(22) Filed: Jun. 29, 2022

(65) Prior Publication Data
US 2024/0004937 A1   Jan. 4, 2024

(51) Int. Cl.
*G06F 16/93*   (2019.01)

(52) U.S. Cl.
CPC .................... *G06F 16/93* (2019.01)

(58) Field of Classification Search
CPC ..... G06F 16/93; G06Q 10/0633; G06Q 10/10
See application file for complete search history.

(56) References Cited

U.S. PATENT DOCUMENTS

| 8,949,706 B2* | 2/2015 | McCabe ................. G06F 21/64 |
| | | 713/180 |
| 9,634,875 B2 | 4/2017 | Porat |
| 10,430,570 B2 | 10/2019 | Gonser et al. |

(Continued)

FOREIGN PATENT DOCUMENTS

| CN | 111108521 A | 5/2020 |
| WO | 2012102710 A1 | 8/2012 |

OTHER PUBLICATIONS

International Search Report and Written Opinion of International Application No. PCT/US2023/023549 dated Aug. 4, 2023, 15 pp.

(Continued)

*Primary Examiner* — Yuk Ting Choi
(74) *Attorney, Agent, or Firm* — Shumaker & Sieffert, P.A.

(57) ABSTRACT

A system configures, executes, and monitors document workflows executing using workflow engines executing on cloud platforms. The system generates a platform independent document workflow specification that describes a document workflow configured for execution on any of a plurality of workflow engines, each workflow engine executing on a cloud platform. The system compiles the platform independent document workflow specification to generate a platform specific document workflow specification configured for execution on a target workflow engine executing on a target cloud platform. A document workflow orchestration runtime executes and monitors the execution of the platform specific document workflow specification.

20 Claims, 12 Drawing Sheets

(56) References Cited

U.S. PATENT DOCUMENTS

| | | | |
|---|---|---|---|
| 10,776,563 B2* | 9/2020 | Hayslett | G06F 40/117 |
| | | | 718/101 |
| 2004/0074961 A1 | 4/2004 | Hull et al. | |
| 2004/0172602 A1 | 9/2004 | Lida et al. | |
| 2005/0273705 A1 | 12/2005 | McCain | |
| 2006/0101328 A1* | 5/2006 | Albornoz | G06Q 10/10 |
| | | | 715/764 |
| 2011/0238458 A1 | 9/2011 | Purcell et al. | |
| 2012/0158596 A1 | 6/2012 | Shafiee et al. | |
| 2012/0303968 A1 | 11/2012 | Balinski et al. | |
| 2015/0332195 A1* | 11/2015 | Jue | G06Q 10/06316 |
| | | | 705/7.26 |
| 2019/0146830 A1* | 5/2019 | Gerber | G06N 20/00 |
| | | | 718/101 |
| 2019/0199612 A1* | 6/2019 | Manoharan | H04L 69/40 |
| | | | 718/101 |
| 2020/0409940 A1 | 12/2020 | Gu et al. | |
| 2021/0056144 A1* | 2/2021 | Klein | G06F 16/93 |
| | | | 718/101 |
| 2022/0308911 A1* | 9/2022 | Barkett | G06F 9/546 |
| | | | 718/101 |

OTHER PUBLICATIONS

Prosecution History from U.S. Appl. No. 17/853,621, dated Jan. 13, 2023 through Apr. 28, 2023, 18 pp.

U.S. Appl. No. 17/853,621, filed Jun. 29, 2022, naming inventors Hilerio et al.

U.S. Appl. No. 17/853,639, filed Jun. 29, 2022, naming inventors Hilerio et al.

Notice of Allowability from U.S. Appl. No. 17/853,621 dated Jun. 20, 2023, 8 pp.

Notice of Allowance from U.S. Appl. No. 18/323,703 dated May 24, 2024, 13 pp.

* cited by examiner

900C

MONITORING EXECUTION OF DOCUMENT WORKFLOWS USING CLOUD PLATFORM INDEPENDENT DOCUMENT WORKFLOW ORCHESTRATION RUNTIME

TECHNICAL FIELD

The disclosure generally relates to the field of document management, and specifically to execution and monitoring of a cloud platform independent representation of document workflow using a document workflow orchestration runtime.

BACKGROUND

Online document management systems can be used to create and review documents and may provide users with tools to edit, view, and execute the documents. The workflow for document management is typically executed on cloud platforms, for example, AMAZON WEB SERVICES (AWS), AZURE, or GOOGLE CLOUD PLATFORM (GCP). Processing the steps of a document management involves executing several platform specific application programming interfaces (APIs) that invoke cloud platform specific services. As a result, document management workflow requires knowledge and understanding of specific cloud platforms. The users that design document management workflow are typically not experts in cloud platform specific technologies. As a result, designing document management workflows can be complicated. Furthermore, document management workflow designed for a particular cloud platform cannot be executed on a different cloud platform.

SUMMARY

A system configures, executes, and monitors document workflows executing using workflow engines executing on one or more cloud platforms. The system configures and presents a user interface for receiving a description of steps of a document workflow. The user interactions received via the user interaction specify steps of document workflows. The system generates a platform independent document workflow specification based on the information received via user interactions performed by a user via the user interface, for example, by a designer describing the document workflow. The user interface may be a client user interface executing on a client device, The platform independent document workflow specification includes a sequence of steps representing actions associated with one or more documents. The platform independent document workflow specification specifies a document workflow configured for execution on any of a plurality of workflow engines. Each workflow engine executes on a cloud platform, for example, one workflow engine may execute on one cloud platform and another workflow engine may execute on another cloud platform. The system receives information identifying a target workflow engine executing on a target cloud platform. The information specifies a user account with access to a workflow engine executing on the target cloud platform. The system compiles the platform independent document workflow specification to generate a platform specific document workflow specification configured for execution on the target workflow engine that is hosted on a particular cloud platform. The compilation causes generation of a set of platform specific steps for execution on the target workflow engine corresponding to a particular step of the document workflow. The platform specific document workflow specification is executed using a document workflow orchestration runtime. The document workflow orchestration runtime is configured to connect with each of a plurality of cloud platforms. The document workflow orchestration runtime creates a connection with the workflow engine executing on the target cloud platform using the user account on the target cloud platform and executes the platform specific document workflow specification using the connection.

According to an embodiment, a system executes document workflows on multiple workflow engines executing on cloud platforms. The system receives a platform independent document workflow specification that comprises a sequence of steps associated with one or more documents. The platform independent document workflow specification specifies a document workflow configured for execution on any of a plurality of workflow engines. Each workflow engine executing on a distinct cloud platform. The system compiles the platform independent document workflow specification to generate a platform specific document workflow specification S1 configured for execution on a target workflow engine E1 executing on a target cloud platform P1 and a platform specific document workflow specification S2 configured for execution on a target workflow engine E2 executing on a target cloud platform P2. The specifications S1 and S2 are provided to one or more computer systems each computer system executing a document workflow orchestration runtime. The computer systems create a connection C1 with the workflow engine E1 executing on the target cloud platform P1 and a connection C2 with a target workflow engine E2 executing on a target cloud platform P2. The one or more computer systems execute the platform specific document workflow specification S1 using the connection C1 and the platform specific document workflow specification S2 using the connection C2.

According to an embodiment, a system monitors execution of document workflows on workflow engines executing on cloud platforms. The system receives a platform independent document workflow specification comprising a sequence of steps associated with one or more documents. The system compiles the platform independent document workflow specification to generate a platform specific document workflow specification configured for execution on a target workflow engine executing on a target cloud platform. The platform independent document workflow specification comprises a particular step and the platform specific document workflow specification includes a set of steps corresponding to the particular step. The system executes the platform specific document workflow specification on the target workflow engine of the target cloud platform. The system monitors execution of the platform specific document workflow specification on the target workflow engine. The monitoring of execution of the platform specific document workflow specification on the target workflow engine comprises determining status of execution of the particular step of the platform independent document workflow specification based on the status of execution of the set of steps of the platform specific document workflow specification. Accordingly, the system maps the steps of the platform specific document workflow specification to the steps of the platform independent document workflow specification and uses the mapping to track the execution of the document workflow at runtime.

According to an embodiment, the system configures for display, a user interface showing a graph representation of the platform independent document workflow specification. A step of the platform independent document workflow specification is represented as a node. The status of a node indicates whether the step corresponding to the node has completed execution, is not yet executed, or is currently being executed. According to various embodiments, the status of a node corresponding to the particular step is indicated as having completed execution if all steps of the set of steps have completed execution; the status of a node corresponding to the particular step is indicated as not yet executed if all steps of the set of steps have not yet executed; and the status of a node corresponding to the particular step is indicated as currently executing if a first subset of the set of steps has completed execution and a second subset of the set of steps is not yet executed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
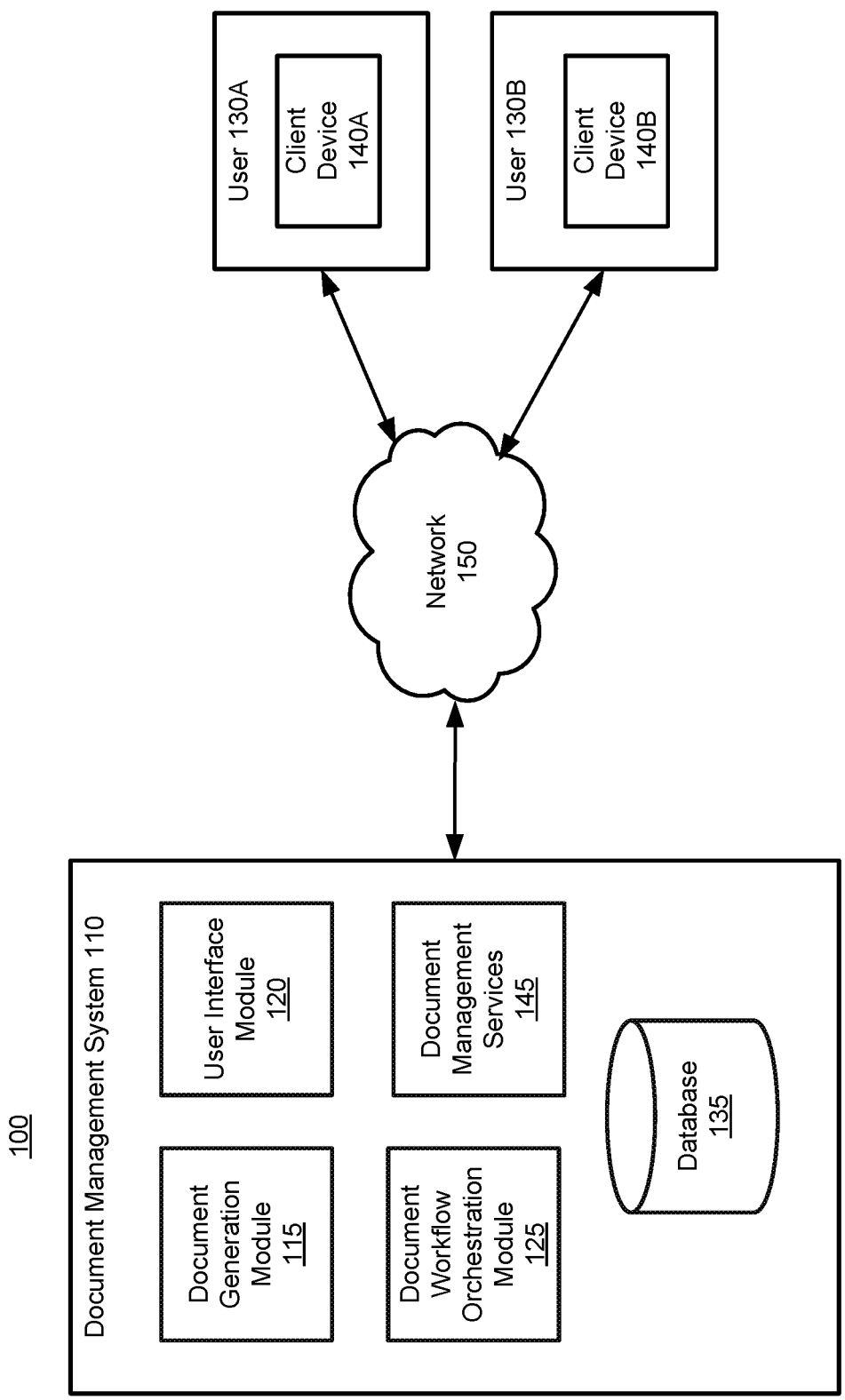
FIG. 1 is a high-level block diagram of a system environment for a document management system, in accordance with an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

DETAILED DESCRIPTION

A system according to various embodiments, allows users to specify document workflows using a high-level platform independent document workflow specification that does not require development expertise or knowledge of the underlying cloud platform on which the document workflow is executed. A document workflow represents a workflow in which one or more users perform actions associated with one or more documents. According to an embodiment, the documents associated with a document workflow are agreement documents or agreements. These actions include filling out information in the document, electronically signing the document, sending the document to other users, and so on. The system compiles the platform independent document workflow specification to generate a platform specific document workflow specification for one or more workflow engines, each executing on a target cloud platform. The system executes the platform specific document workflow specification. Embodiments perform document workflow orchestration for executing and monitoring of the document workflows across one or more workflow engines, each workflow engine executing on a cloud platform.

Document Management System Overview

A document management system enables a party (e.g., individuals, organizations, etc.) to create and send documents to one or more receiving parties for negotiation, collaborative editing, electronic execution (e.g., via electronic signatures), contract fulfilment, archival, analysis, and more. For example, the document management system allows users of the party to create, edit, review, and negotiate document content with other users and other parties of the document management system. An example document management system is further described in U.S. Pat. No. 9,634,875, issued Apr. 25, 2017, and U.S. Pat. No. 10,430,570, issued Oct. 1, 2019, which are hereby incorporated by reference in their entireties.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Users may choose to take a set of actions with respect to the generated document. Document actions may include, for example, sending the document to another user for approval, signing the document, initiating a negotiation of the terms of the document, and so on. The document management system allows users to customize a workflow for these document actions such that the document management system automatically performs actions upon request.

FIG. 1 is a high-level block diagram of a system environment 100 for a document management system 110, in accordance with an example embodiment. The system environment 100 enables users 130A-B to more efficiently generate documents with the document management system 110. As illustrated in FIG. 1, the system environment 100 includes a document management system 110, users 130A, 130B, and corresponding client devices 140A, 140B, each communicatively interconnected via a network 150. In some embodiments, the system environment 100 includes components other than those described herein. For clarity, although FIG. 1 only shows two users 130A, 130B and two client devices 140A, 140B, alternate embodiments of the system environment 100 can have any number of users 130A, 130B and client devices 140A, 140B. For the purposes of concision, the web servers, data centers, and other components associated with an online system environment are not shown in FIG. 1.

The document management system 110 is a computer system (or group of computer systems) for storing and managing documents for the users 130A-B. Using the document management system 110, users 130A-B can collaborate to create, edit, review, and negotiate documents. Examples of documents that may be stored, analyzed, and/or managed by the document management system 110 include contracts, press releases, technical specifications, employment agreements, purchase agreements, services agreements, financial agreements, and so on. The document management system 110 can be a server, server group or cluster (including remote servers), or another suitable computing device or system of devices. In some implementations, the document management system 110 can communicate with client devices 140A-B over the network 150 to receive instructions and send documents (or other information) for viewing on client devices 140A-B. The document management system 110 can assign varying permissions to individual users 130A-B or groups of users controlling which documents each user can interact with and what level of control the user has over the documents they have access to.

The document management system 110 includes a document generation module 115, a user interface module 120, a workflow module 125, a document workflow orchestration module 125, document management services 145, and a database 135. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein.

The database 135 stores information relevant to the document management system 110. The database 135 can be implemented on a computing system local to the document management system 110, remote or cloud-based, or using any other suitable hardware or software implementation. The data stored by the database 135 may include, but is not limited to, documents for analysis and/or execution, client device identifiers (e.g., of the client devices 140A-B), document clauses, version histories, document templates, and other information about document stored by the document management system 110. In some embodiments, the database 135 stores metadata information associated with documents or clauses, such as documents labeled with training data for machine learning models. The document management system 110 can update information stored in database 135 as new information is received, such as new documents and feedback from users. The document management system 110 can update information stored in the database 135 based on user input received from a user interface, via the user interface module 120. Updates to machine learned models are also stored in the database 135.

The document management services 145 perform predefined operations that may be invoked by a document workflow. These include signing service, identity verification service, form generation service, and so on. According to an embodiment, the document workflow orchestration module 125 invokes APIs for executing any of the document management services 145. The document workflow orchestration module 125 may invoke an API remotely for executing a document management service 145 in a workflow engine executing in a cloud platform distinct from the system executing the document management services 145. A workflow engine includes modules of a document management system 110 that execute steps of document workflow. For example, the workflow engine may include one or more document management services 145 that performs actions performed during document workflows such as signing of documents, identity verification, form generation, document generation from metadata, and so on. The functions of a workflow engine may be executed remotely by invoking application programming interfaces (APIs) of the workflow engine. For example, a document workflow orchestration module 125 may remotely execute operations supported by one or more workflow engine to complete execution of a document workflow across multiple workflow engines, each executing on a distinct cloud platform.

The document workflow orchestration module 125 allows users to design a document workflow, deploy the workflow and execute the workflow. The document workflow specification as specified by a user is independent of the platform on which it can be executed. For example, the document workflow specification can be executed on a workflow engine executing on any of a plurality of cloud platforms such as AWS, GCP, AZURE, and so on. In an example document workflow, the document generation module 115 presents the generated document preview, allowing the user to take a set of document actions. Example document actions include, but are not limited to, approving the document, finalizing the document, signing the document, providing the document to another user, and revising the document. The user may manually carry out the document actions. The document workflow orchestration module 125 allows a user (e.g., a workflow designer) to define workflows (e.g., a sequence of document actions) that the document management system 110 performs automatically. According to an embodiment, the document workflow orchestration module 125 executes on a cloud platform that is distinct from the cloud platforms on which the workflow engines execute for executing the workflows that are designed and executed remotely using the document workflow orchestration module 125.

The document generation module 115 facilitates the creation of documents. According to an embodiment, a user uploads a training document and the document generation module 115 generates a document template based on a type of the training document. In some embodiments, the document generation module 115 generates the document template in response to a user request. The document generation module 115 may produce templates for employment agreements, distribution agreements, sales agreements, non-disclosure agreements, leases, promissory notes, and so on.

In some embodiments, the document generation module 115 generates the document template using a machine learned model configured to identify a type of the training document and generate associated terms. The machine learned model is trained on a training set of documents that includes different types of documents that are each labeled with terms. For example, a master services agreement in the training set is labeled accordingly, as are portions of the document that correspond to terms like party names, terms of the services, effective date, and so on. The machine learned model may be trained using supervised or unsupervised machine learning. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The trained machine learned model, when applied to the training document uploaded by the user, can identify a type of the training document and generate associated terms accordingly. The document generation module 115 uses the machine learned model's output to generate the document template and terms for the type of document uploaded and/or requested by the user. The document template is displayed as per one or more document formatting rules (e.g., bullet points, indentation, font type, font size, text style, etc.).

According to an embodiment, the document generation module 115 automatically generates a form interface with fields for completion. The form interface displays fields that correspond to the user selected candidate document tags and enable input as to specific terms of the document template. In some embodiments, the document generation module 115 generates and displays a list of suggested fields corresponding to additional candidate document tags that were not selected by the user. For example, the document generation module 115 may suggest terms that are often found in documents of the same type, but that the user did not select. Additionally, the document generation module 115 determines an order for displaying the fields based on, for example, the order in which the candidate document tags appear on the document template. The document generation module 115 may use the machine learned model described above to generate the suggested fields and/or the order for displaying the fields. The machine learned model is configured to identify the type of the training document and/or document template uploaded by the user, identify terms associated with the type of the document template, and/or an order of the terms within the document template.

The document generation module 115 accesses data values for each of the fields displayed on the form interface. Each data value corresponds to one or more candidate document tags and may be manually input by the user. In some embodiments, the document generation module 115 accesses the data values from a relational database and/or other forms of structured data.

Once the form interface is completed, the document generation module 115 creates a document preview for the user. The document preview is a modified document template that includes the accessed data values in place of the text representations of each candidate document tag. The accessed data values in the document preview follow the document template's formatting rules. For example, if the document template designates a set of terms to be indented, the accessed data values corresponding to the set of terms will be indented.

The user interface (UI) module 120 generates user interfaces allowing users (e.g., the users 130A-B) to interact with the document management system 110. The UI module 120 displays and receives user input for the embedded tagging interface, the form interface, and the workflow interface in the document management system 110. The UI module 120 also provides a user interface for users to add, delete, or modify the contents of a document template, document preview, or finalized document based on permission definitions. Additionally, in some embodiments, the UI module 120 may provide a user interface that allows users to modify content such as text, images, links to outside sources of information such as databases, and the like.

Users 130A-B of the client devices 140A-B can perform actions relating to documents stored within the document management system 110. Each client device 140A-B is a computing device capable of transmitting and/or receiving data over the network 150. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client devices 140A-B include an application through which the users 130A-B access the document management system 110. The application may be a stand-alone application downloaded by the client devices 140A-B from the document management system 110. Alternatively, the application may be accessed by way of a browser installed on the client devices 140A-B and instantiated from the document management system 110. The client devices 140A-B enables the users 130A-B to communicate with the document management system 110. For example, the client devices 140A-B enables the users 130A-B to access, review, execute, and/or analyze documents within the document management system 110 via a user interface. In some implementations, the users 130A-B can also include AIs, bots, scripts, or other automated processes set up to interact with the document management system 110 in some way. According to some embodiments, the users 130A-B are associated with permissions definitions defining actions users 130A-B can take within the document management system 110, or on documents, templates, permissions associated with other users and/or workflows.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

System Architecture of Document Workflow Orchestration Module

Figure 2:
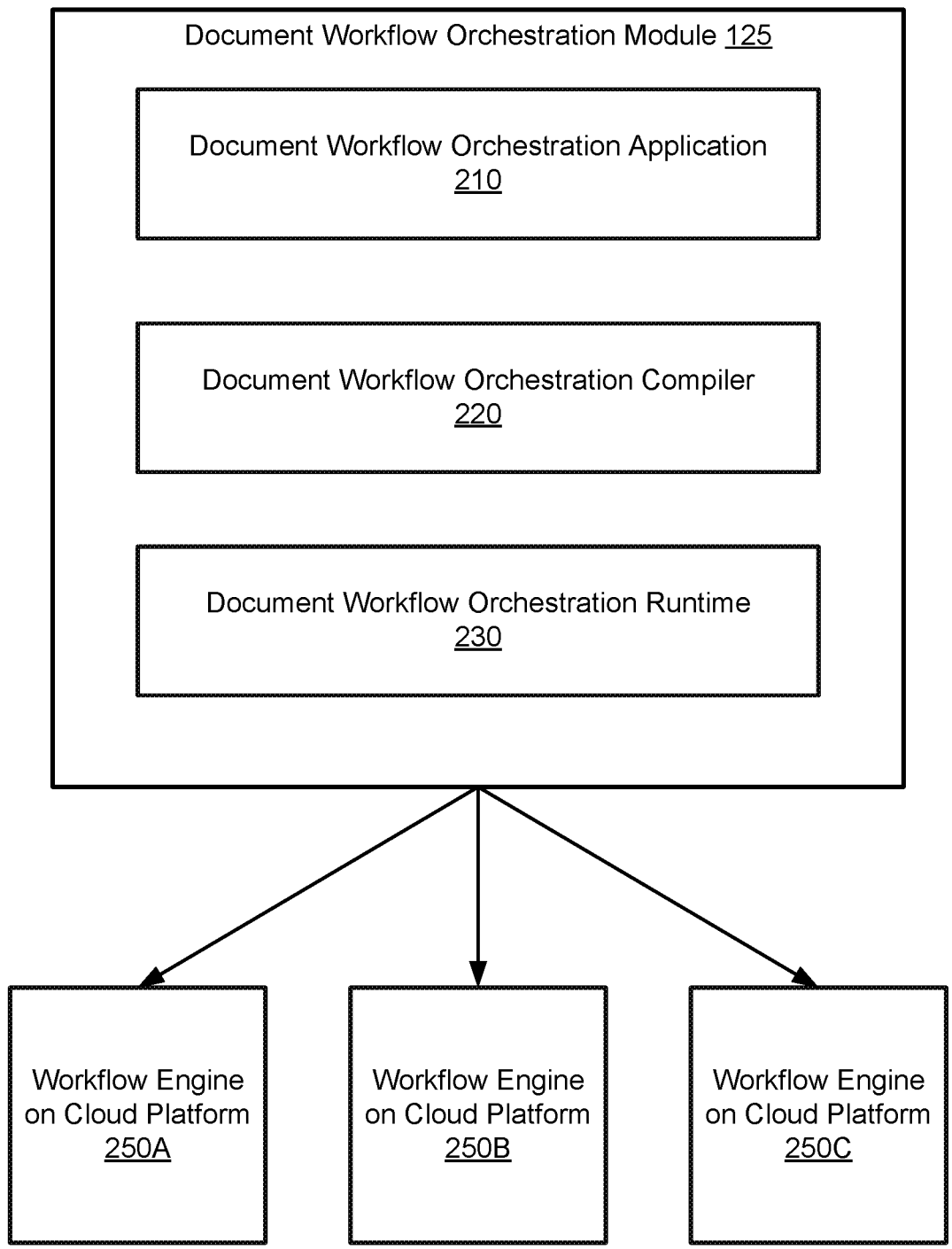
FIG. 2 is a high-level block diagram of a system architecture of the document workflow orchestration module, in accordance with an example embodiment.

FIG. 2 is a high-level block diagram of a system architecture of the document workflow orchestration module, in accordance with an example embodiment. The document workflow orchestration module includes a document workflow orchestration application 210, a document workflow orchestration compiler 220, and a document workflow orchestration runtime 230. Other embodiments may include more, fewer, or other modules than those indicated in FIG. 2 and not all modules of the document workflow orchestration module 125 are shown in FIG. 2.

The document workflow orchestration application 210 configures and sends for display via a client device, a user interface that allows users to design a document workflow. The user interface of the document workflow orchestration application 210 allows users to define a document workflow. According to an embodiment, the document workflow orchestration application 210 presents an example template of a generic workflow of a particular type and allows the user to modify the template to obtain the desired workflow. For example, the user may add or remove certain steps of the workflow. The user may modify each specific step to customize the steps and the overall workflow as necessary. The output generated by the document workflow orchestration application 210 is a platform independent workflow specification of a workflow. The platform independent workflow specification may be represented using nested objects such that each nested object represents a step of the workflow. Each step of the workflow represented using an object O1 may itself be a workflow that is represented using objects nested within the object O1. According to an embodiment, the platform independent workflow specification as well as the platform specific workflow specification are specified using JSON (JavaScript Object Notation) format.

The document workflow orchestration compiler 220 receives information identifying a particular platform, for example, a workflow engine executing on a target cloud platform and compiles the platform independent document workflow specification to generate a platform specific document workflow specification. For example, the target cloud platform may be AWS, GCP, or AZURE. The platform specific document workflow specification includes the information needed to execute the workflow on the identified workflow engine executing on the particular type of cloud platform. The document workflow orchestration compiler 220 may compile the platform independent document workflow specification to generate a platform specific document workflow specification for multiple workflow engines, each targeted for a different cloud platform, for example, one platform specific document workflow specification may be generated for execution on a workflow engine executing on AWS and another platform specific document workflow specification may be generated for execution on a workflow engine executing on GCP.

The document workflow orchestration runtime 230 executes the generated platform specific document workflow specification by invoking the appropriate APIs of the workflow engine 250A, 250B, 250C executing on the target cloud platform. The document workflow orchestration runtime 230 may execute multiple instances of the same platform specific document workflow specification on the workflow engine executing on the target cloud platform, for example, for different users. The document workflow orchestration runtime 230 may execute the same platform independent document workflow specification on multiple different workflow engines, each executing on a different target cloud platform. For example, the document workflow orchestration runtime 230 may execute the same platform independent document workflow specification on a workflow engine executing on AWS and also on a workflow engine executing on GCP.

Figure 3:
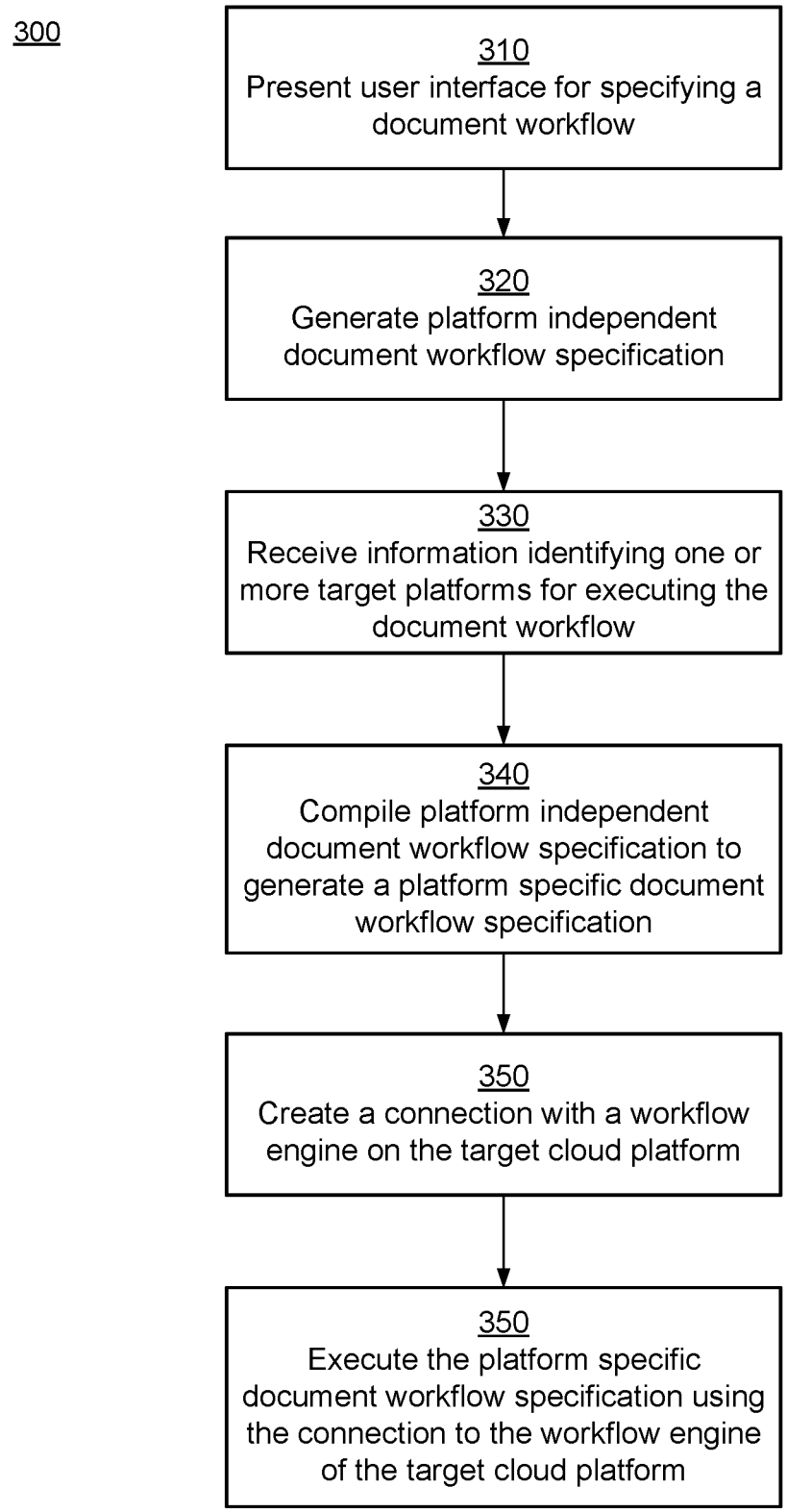
FIG. 3 is a flowchart illustrating a process for executing a document workflow on a target cloud platform, in accordance with an example embodiment.
Figure 5:
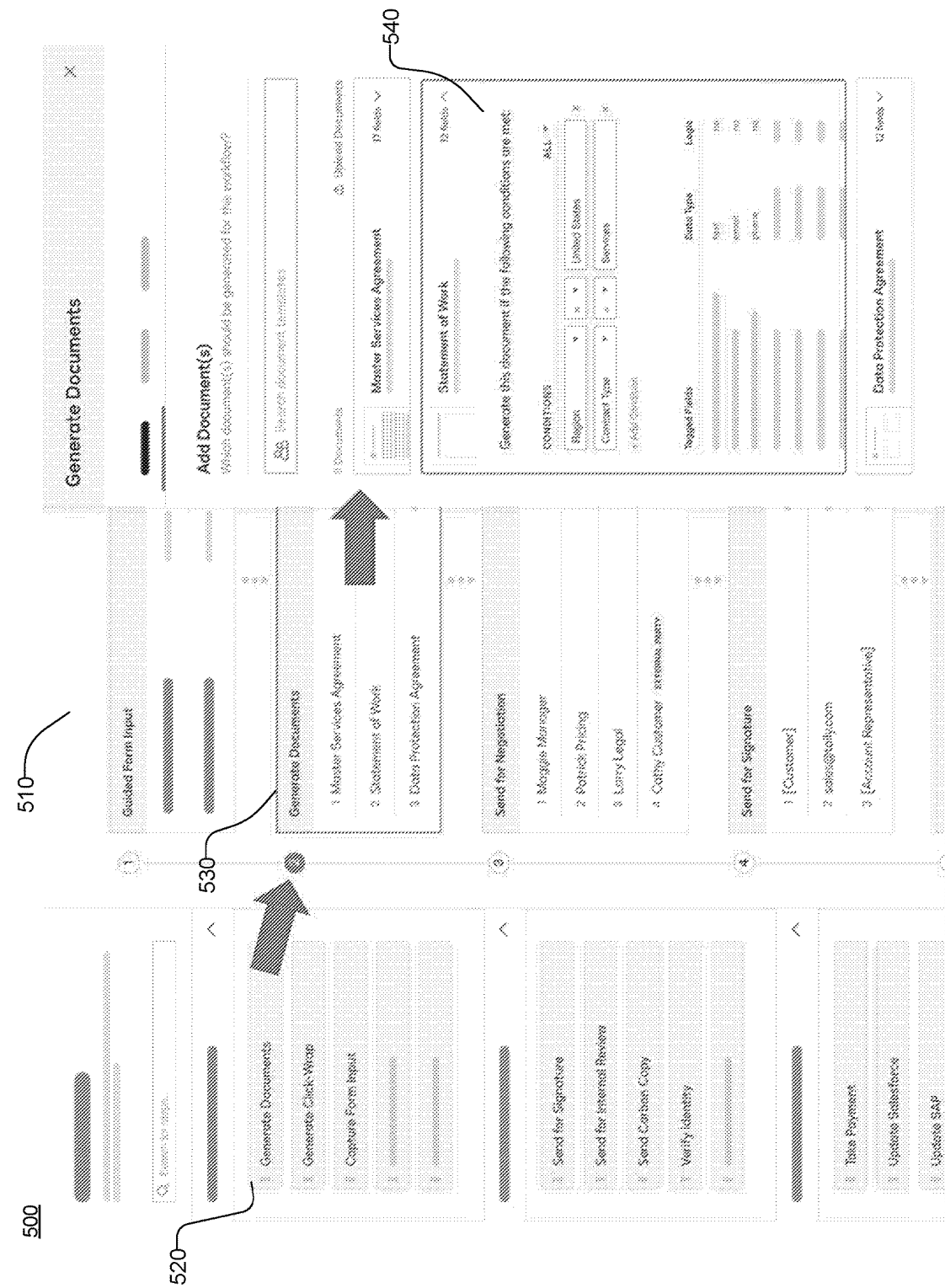
FIG. 5 is an example screenshot of a user interface presented by the document workflow orchestration application for designing a document workflow, according to an embodiment.
Figure 6:
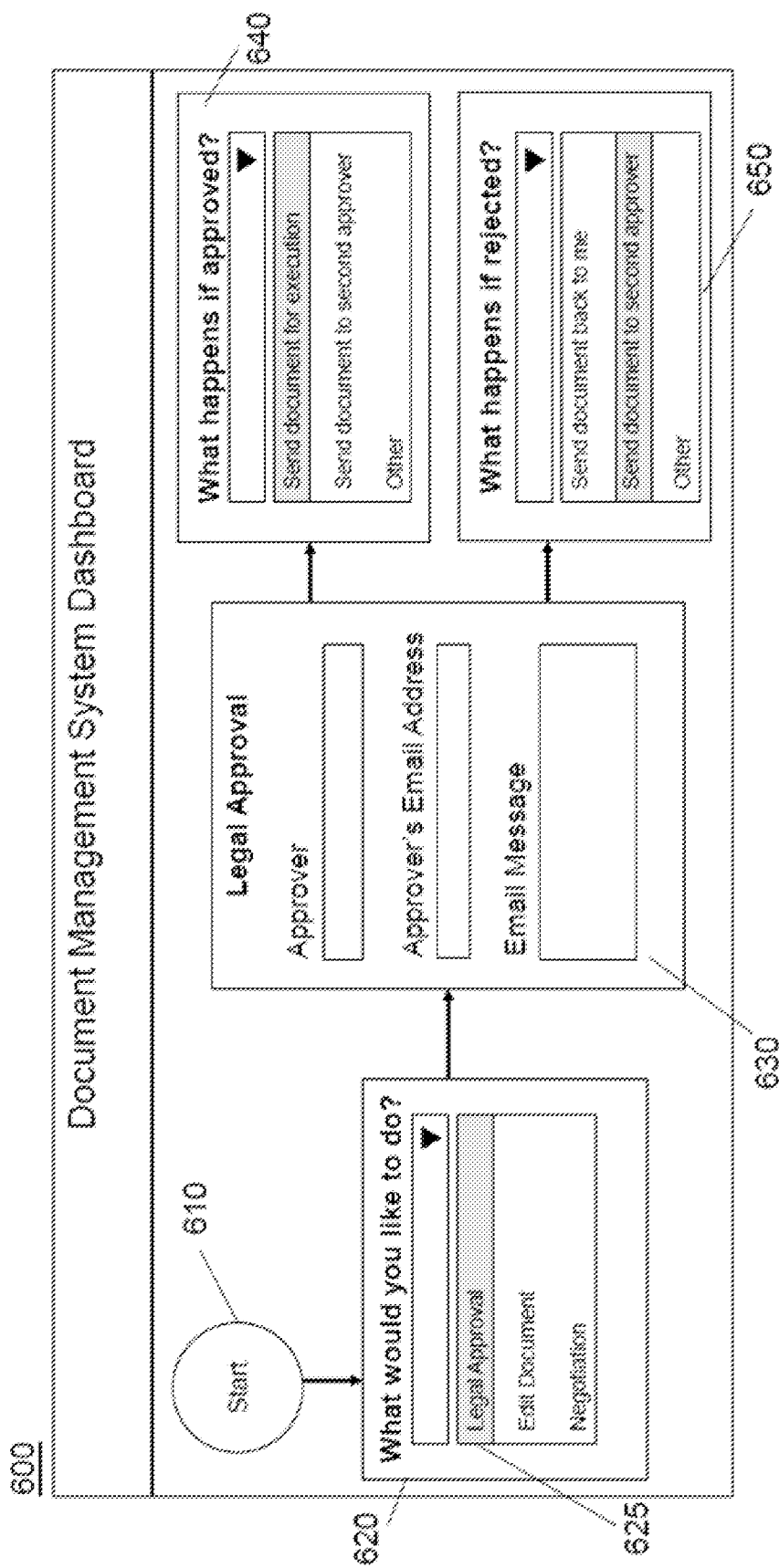
FIG. 6 is another example screenshot of a user interface presented by the document workflow orchestration application for designing a document workflow, according to an embodiment.

FIG. 3 is a flowchart illustrating a process 300 for executing a document workflow on a target cloud platform, in accordance with an example embodiment. The document workflow orchestration module 125 presents 310 a user interface that allows a user, for example, a document workflow designer to create a document workflow. According to an embodiment, the document workflow orchestration application 210 stores a set of document workflow template that define the core steps of different types of document workflows. Each document workflow template may be associated with a particular workflow scenario. The document workflow designer may browse through the repository of document workflow templates and select one. Alternatively, the document workflow designer provides description of the workflow scenario and the document workflow orchestration module 125 selects a document workflow template based on the workflow description and presents to the user. The document workflow orchestration module 125 may select a document workflow template for a document workflow description based on a comparison of keywords provided in the description provided by the user and metadata describing the various document workflow templates. The document workflow orchestration application 210 presents 310 a user interface that allows the document workflow designer to customize the template to the specific workflow that the document workflow designer is interested in. Examples of the user interface for customizing a document workflow template are shown in FIGS. 5-6 and described in connection with these figures.

The document workflow orchestration application 210 generates 320 a platform independent document workflow specification based on the user interactions performed by the document workflow designer with the user interface presented by the document workflow orchestration application 210. The document workflow orchestration compiler 220 receives the platform independent document workflow specification generated by the document workflow orchestration application 210. The document workflow orchestration compiler 220 further receives 330 information identifying a target platform for executing the document workflow. According to an embodiment, a target platform is a workflow engine that executes on a cloud platform. The document workflow orchestration compiler 220 may receive 330 information describing a plurality of target platforms such that a subset of the steps of the document workflow may be executed on a target platform P1 and another subset of steps of the document workflow may execute on a different target platform P2. The document workflow orchestration compiler 220 may further receive information identifying the steps of the document workflow that need to be executed on a specific target platform. For example, the document workflow orchestration compiler 220 may receive an association between the steps of the document workflow specified by the user and the target platforms. According to an embodiment, the information describing each target platform includes a network address of the workflow engine executing on a cloud platform so that the document workflow orchestration runtime can connect with the workflow engine. The information describing each target platform further includes user accounts on each target platform and associated credentials for connecting with the target platform. In an embodiment, the information describing each target platform further includes a type of deployment environment on which the document workflow is deployed in the target platform, for example, test environment, staging environment, or production environment.

The document workflow orchestration compiler 220 compiles 340 the platform independent document workflow specification in conjunction with the information identifying the target platforms to generate a platform specific document workflow specification. For example, each step of the document workflow as specified in the platform independent document workflow specification may map to a set of steps that are specific to a target platform. For example, a particular document workflow step of the platform independent document workflow specification may map to a set S1 of document workflow steps for target platform P1 but a different set S2 of document workflow steps for a target platform P2. The translation of a step of the platform independent document workflow specification into steps of platform specific document workflow specification may further depend on the type of deployment environment in which the workflow is being deployed. For example, the steps of platform specific document workflow specification corresponding to a step of the platform independent document workflow specification generated for a test environment may be different from the corresponding steps generated for a production environment.

A step of the platform independent document workflow specification may be specified by identifying a type of step and specifying details including inputs, outputs, and configuration parameters associated with the step. Following is an example step of the platform independent document workflow. The description of the step include a custom code with description of the inputs and outputs, a description of the step, a provider of the step, an account identifier for executing the step, and a type of the step.

FaaS Step
   Custom Code
      Input
      Output
   Description
   Provider
   AccountId
   Type=DS-FaaS The above FaaS step is compiled into three distinct steps that are platform specific, for example, for execution on a workflow engine executing on an AZURE cloud platform. The first step performs a create App operation, the second step performs an execute app operation, and the third step performs an operation to get execution status of the app.

// first step //
Create App
   Custom Code
   Description
   Provider
   AccountId
// second step//
Execute App
// third step//
Get Exec Status Following are further details of the FaasStep of the platform independent document workflow specification described above. The description of the FaaS_Step provided by a workflow designer is as follows and includes a type of the step, inputs, and outputs. The input includes custom code for execution.

```
"FaaS_Step": {
  "type": "DS-FaaS",
  "input": { "custom-code" :"export default function main(args:{ }) : Record<string, string> { return { number: \"5\" }; }" },
  "output": { "result" : "FaaSResult"}
}
```

Furthermore, the following metadata is associated with the above.

```
"FaaS_Step_Metadata" : {
    "config": { "<URL1>" : "url value 1",
        "<URL2>" : "url value 2",
        "<URL3>" : "url value 3"
    }
}
```

The above step is compiled into a sequence of multiple steps including create_Faas, Execute_Faas, Get_Faas_Status, and so on.

```
"FaaS_Step": {
   "actions": {
     "Create_FaaS": {
       "inputs": {
         "body": {
           "fields": { "customCode": "<custom-code>" },
           "Provider": "actfaas"
         },
         "method": "POST",
         "uri": "<URL1>"
       },
       "runAfter": {
         "Get_Access_Token": ["Succeeded"]
       },
       "type": "Http"
     },
     "Execute_FaaS": {
       "inputs": {
         "method": "POST",
         "uri": "<URL2>"
       },
       "runAfter": {
         "Create_FaaS": ["Succeeded"]
       },
       "type": "Http"
     },
     "Until": {
       "actions": {
         "Get_FaaS_Status": {
           "inputs": {
             "method": "POST",
             "uri": "<URL3>"
           },
           "runAfter": { },
           "type": "Http"
         },
         "Set_variable": {
           "inputs": {
             "name": "FaaSResult", "value": "<input>"
           },
           "runAfter": {
             "Get_FaaS_Status": [ "Succeeded" ]
           },
           "type": "SetVariable"
         }
       },
       "expression": "@equals(variables('FaaSResult'), '\"SUCCESS\"')",
       "limit": {
         "count": 60, "timeout": "PT1H"
       },
       "runAfter": {
         "Execute_FaaS": ["Succeeded" ]
       },
       "type": "Until"
     }
}
```

```
        },
        "runAfter": {
            "Get_Token": ["Succeeded"]
        },
        "type": "Scope"
    },
    ...
```

The document workflow orchestration compiler 220 provides the generated platform specific document workflow specification to the document workflow orchestration runtime 230. The document workflow orchestration runtime 230 creates 350 a connection with each workflow engine of the corresponding target platform (or target platforms) that were received in step 330. The document workflow orchestration runtime 230 executes the steps of the platform specific document workflow specification using the connection to the workflow engine (or workflow engines). The document workflow orchestration runtime 230 further receives status of execution of each step from the workflow engine that executed the steps.

Figure 4:
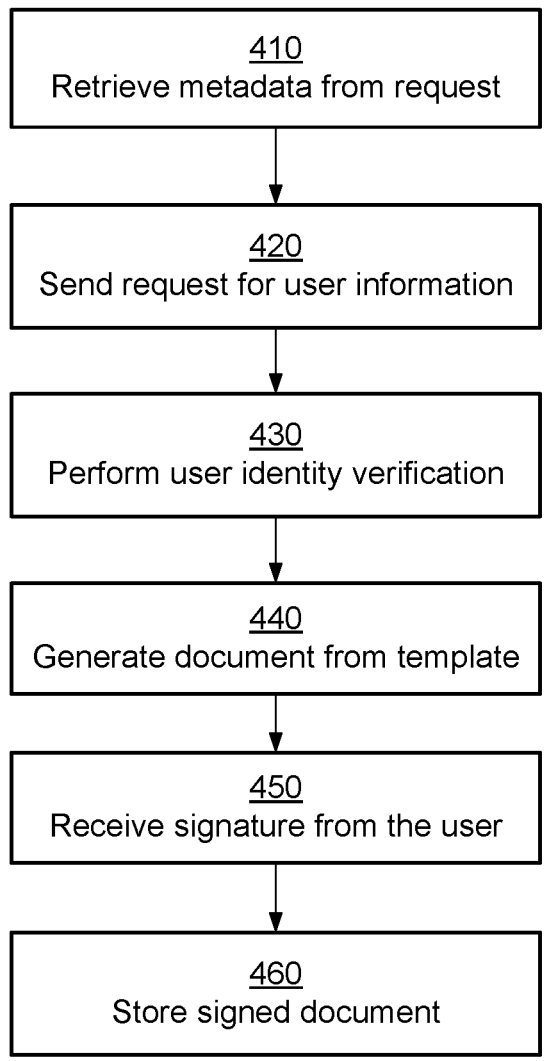
FIG. 4 an example workflow designed and deployed using the document workflow orchestration module, in accordance with an example embodiment.

FIG. 4 an example workflow 400 designed and deployed using the document workflow orchestration module, in accordance with an example embodiment. A user may be provided with a URL (uniform resource locator) that represents a request, for example, an HTTP (hypertext transfer protocol). The document management system 110 retrieves 410 metadata from the URL. The document management system 110 sends 420 a request for user information, for example, by presenting a form to the user for providing requested information. In an embodiment, the form is a webform provided to the user when the user clicks on the URL. The form allows user to provide information used for identity verification, for example, first name, last name, data of birth, and so on. The document management system 110 performs 430 user identity verification based on the information received from the user. The document management system 110 may display identity verification information to the user based on the information received from the user. If the identity verification succeeds, the document management system 110 generates 440 a document from a template and provides to the user for performing signing. If the identity verification fails, the document management system 110 ends the process. The document management system 110 receives 450 a signature from the user. The document management system 110 stores 460 the signed document, for example, in a document storage system such as GOOGLE DOCs. The various actions performed such as identity verification, signing, generating forms, and so on are services of the document management system 110. The document workflow orchestration module 125 allows the example workflow (or any other document workflow specified by a user) on any workflow engine executing on any target cloud platform. For example, the same workflow execution may be executed on a workflow engine E1 executing in a target cloud platform P1 as well on a workflow engine E2 executing in a target cloud platform P2. In some embodiments, the document workflow orchestration module 125 a workflow to be executed using multiple workflow engines, each executing on a distinct target cloud platform. For example, the signing step 450 may be performed by the workflow engine E1 executing in the target cloud platform P1 and the identify verification step 430 may be performed by the workflow engine E2 executing in the target cloud platform P2. The steps of the workflow may be user driven, for example, by a user clicking on a URL or by a user filling out a form and clicking on a submit button. The steps of the workflow may be event driven and executed automatically without a user intervention. For example, when a user completes signing a document, the system may perform a sequence of actions automatically including sending an email information a target user about the execution of the workflow, save the document in a repository, export the document to a different format, and start execution of a subsequent step or a subsequent workflow. The workflow specification may specify that a step should be executed synchronously so that the system waits for the completion of the step before starting the next step. Alternatively, the workflow specification may specify whether a step should be executed asynchronously so that the system does not wait for the completion of the step before starting the next step. For example, the document may be saved to a repository in an asynchronous manner while the system continues processing a subsequent step of the workflow.

FIG. 5 is an example screenshot of a user interface 500 presented by the document workflow orchestration application for designing a document workflow, according to an embodiment. The document workflow 510 being built by a user is represented as a sequence of document workflow steps. The document workflow 510 may be initialized using a template that is further modified by the document workflow designer. The document workflow designer may delete certain steps, add certain steps, or modify certain steps of the sequence 510. The user interface 500 presents a list 520 the various types of actions that can be taken during a document workflow. A document workflow designer can drag and drop actions from the list 520 into the sequence 510 of steps so that the action selected 530 becomes a step of the sequence 510. The document workflow designer may select a step from the sequence 510 and modify the step using the widget 540. The modifications of the step include specifying a particular criteria (e.g., a boolean condition) when the step should be executed, specifying input parameters for the step, specifying various configuration parameters for the step, and so on. The document workflow designer iteratively modifies the document workflow definition by modifying the sequence 510 of steps to finalize the document workflow. The document workflow orchestration application generates a platform independent document workflow specification based on the user specification provided using the user interface 500.

FIG. 6 is another example screenshot of a user interface presented by the document workflow orchestration application for designing a document workflow, according to an embodiment. The document workflow orchestration application 210 generates a starting element (e.g., a start button), which presents an initial set of workflow operations (e.g., document actions) for the user to select. The workflow module 125 presents one or more fields for the user to complete based on the selected workflow operation. In some embodiments, the workflow module 125 seeks input from the user on "workflow branches." A workflow branch is a workflow for the document management system 110 to follow after a specific outcome of the first workflow operation. After the user requests the initiation of the defined workflow, the workflow module 125 executes each of the actions specified in the workflow.

For example, the user may choose, as the workflow operation, to send a document to a supervisor for approval. The workflow module 125 presents fields to the user, seeking input on the supervisor's name, email address, and any email message to be included with the document. Then, the workflow module 125 asks the user to define an approval workflow branch and a rejection workflow branch. The approval workflow branch designates actions for the document management system 110 to take if the supervisor approves the document. Similarly, the rejection workflow branch designates actions for the document management system 110 to take if the supervisor rejects the document. Each workflow branch can include a second approval workflow branch and a second rejection workflow branch, thus enabling a nested workflow tree corresponding to the document.

In some embodiments, the workflow module 125 determines the initial set of workflow operations to present to the user using a machine learned model. The machine learned model is trained on a training set of documents, each labeled with a type and associated with certain actions. In response to receiving a target document specified by the user, the trained machine learned model is configured to identify a type of the target document and generate a set of workflow operations specific to the type of the target document. In some embodiments, the type of the target document is provided through user input, based on which the machine learned model outputs the initial set of workflow operations.

The user may manually take one or more document actions after viewing a generated document. The user interface 600 allows the user to set up an automated workflow for document actions. First, the user selects a starting workflow interface element 610, in response to which the workflow interface 600 presents a set of first workflow operations 620. After the user selects a first workflow operation 625, the workflow interface 600 displays fields for parameters 630 specific to the first workflow operation 625. In some embodiments, the first workflow operation 625 may result in a variety of outcomes. The workflow interface 600 further includes workflow branches which connect each outcome to a different set of document actions. Examples of workflow branches include, but are not limited to, approval workflows 640, rejection workflows 650, signature workflows, routing workflows, and any combination thereof.

An approval workflow 640 designates one or more document actions for the document management system 110 to perform if an approver (e.g., a second user) approves the target document. For example, the approval workflow 640 may require the document management system 110 to seek signatures from the approver, or provide the target document to a second approver, for example. The rejection workflow 650 designates one or more document actions for the document management system 110 to perform if the approver rejects the target document. For example, the rejection workflow 650 may require the document management system 110 to send the target document back to the user or to another approver. A signature workflow requires that the target document be executed by one or more users of the document management system 110. In some embodiments, the signature workflow follows the approval workflow 640. A routing workflow requires that the target document be sent to multiple users. For example, combining the approval workflow 640, routing workflow, and signature workflow may require the document management system 110 to send the target document to a second user for signing, once the first approver has approved the target document. If a threshold amount of time passes without an approver or signer taking any action on the target document (e.g., if an approver fails to approve, reject, or sign the target document), the document management system 110 may perform a time-based workflow operation. The time-based workflow operation may require, for example, the document management system 110 to send the target document back to the user or send a reminder to the approver or signer. The document management system 110 initiates the workflow for a target document when prompted by the user. The document management system 110 performs at least a portion of the workflow as per an order of the workflow operations on the workflow interface 600.

For example, in FIG. 6, the selected first workflow operation 620 is legal approval; the associated parameters 630 include an approver's name and email address, as well as an email message to send to the approver. When requested by the user, the document management system 110 initiates the legal approval workflow, which is the first workflow operation 625. The document management system 110 sends the target document to the approver by email and includes the email message, as per the parameters 630. Then, if the approver approves the target document, the document management system 110 performs the approval workflow 640. If the approver rejects the target document, the document management system 110 performs the rejection workflow 650. The user may define a time-based workflow operation for the document management system 110 to follow if the approver fails to approve or reject the target document.

A workflow branch may be created automatically, or may be suggested to a user based on a type of workflow operation selected by the user. For instance, if the user selects a security workflow operation, a credentials check workflow branch can be created that is configured to enable an entity to authenticate themselves, and the credentials check workflow branch can include an authenticated workflow branch in the event the entity authenticates themselves (for instance, that leads to a document signature workflow branch), and a recursive rejected workflow branch in the event that the entity is unable to authenticate themselves (for instance, that leads back to the credentials check workflow branch, enable the entity to try to authenticate themselves again). Likewise, if the user selects a notary workflow operation, a notarization workflow branch can be created that is configured to enable a third-party notary to witness an electronic signature process. The notarization workflow branch can include a "notary present" workflow branch that enables the electronic signature process to proceed if a notary is able to witness the electronic signature process (e.g., either in person or remotely), and can include a "notary not present" workflow branch that prevents that workflow from proceeding to the electronic signature process until a notary is present.

In some embodiments, a workflow branch may be created automatically, or may be suggested to a user based on parameter or parameter value selected by the user when defining a workflow operation. For example, if the user selects a transaction amount parameter in a signature request, a payments workflow branch can be created that enables a signing entity to provide account information for a transfer of funds associated with the signature document. Likewise, if the user selects a transaction parameter value that is greater than a particular threshold (e.g., the user requests $1,000,000 from the signing entity when the threshold value is $500,000), a supervisor workflow branch is created to enable a supervisor of the signing entity to sign off on the requested cost before the signing entity transfers funds.

In some embodiments, a workflow branch associated with a first workflow operation can return to a previous workflow operation. For example, for a workflow that 1) authenticates a user, 2) requests that the user review a document, and 3) requests that the user sign a document, sequentially for each of a plurality of users, a workflow branch can extend from the signing workflow operation to the authentication workflow operation. This enables a first user to be authenticated, review and sign the document, then enables a next user to be authenticated, review and sign the document, and so forth until each of the plurality of users has signed the document.

The system allows users to customize a document workflow. The document management system generates a document workflow interface (e.g., the workflow interface 600). The document workflow interface comprises a starting workflow interface element (e.g., the starting workflow interface element 610). The document management system presents a set of first workflow operations (e.g., the set of first workflow operations 620) in response to a selection of the starting workflow interface element. For example, the user may click on or otherwise interact with the starting workflow interface element. The document management system modifies the document workflow interface by modifying the starting workflow interface element based on a selected first workflow operation (e.g., the first workflow operation 625). The modified starting workflow interface element includes fields defining parameters (e.g., the parameters 630) of the selected first workflow operation. The document management system modifies the document workflow interface to include a first workflow branch corresponding to an approval workflow operation (e.g., the approval workflow 640). The document management system modifies the document workflow interface to include a second workflow branch corresponding to a rejection workflow operation (e.g., the rejection workflow 650). After the approval and rejection workflow operations are defined, the document management system generates a document workflow defining an ordered set of operations. The ordered set of operations includes the first workflow operation, the approval workflow operation, and the rejection workflow operation. The document management system performs at least a portion of the ordered set of operations on a target document after receiving a request to initiate the document workflow on the target document.

Monitoring Execution of Document Workflows

The document workflow orchestration runtime 230 executes document workflows on workflow engines executing on cloud platforms. A workflow engine executing on a cloud platform either runs on the cloud platform or The document workflow orchestration runtime 230 also monitors execution of a document workflow across one or more workflow engines. The document workflow orchestration runtime 230 configures a user interface that displays progress of a document workflow.

Figure 7:
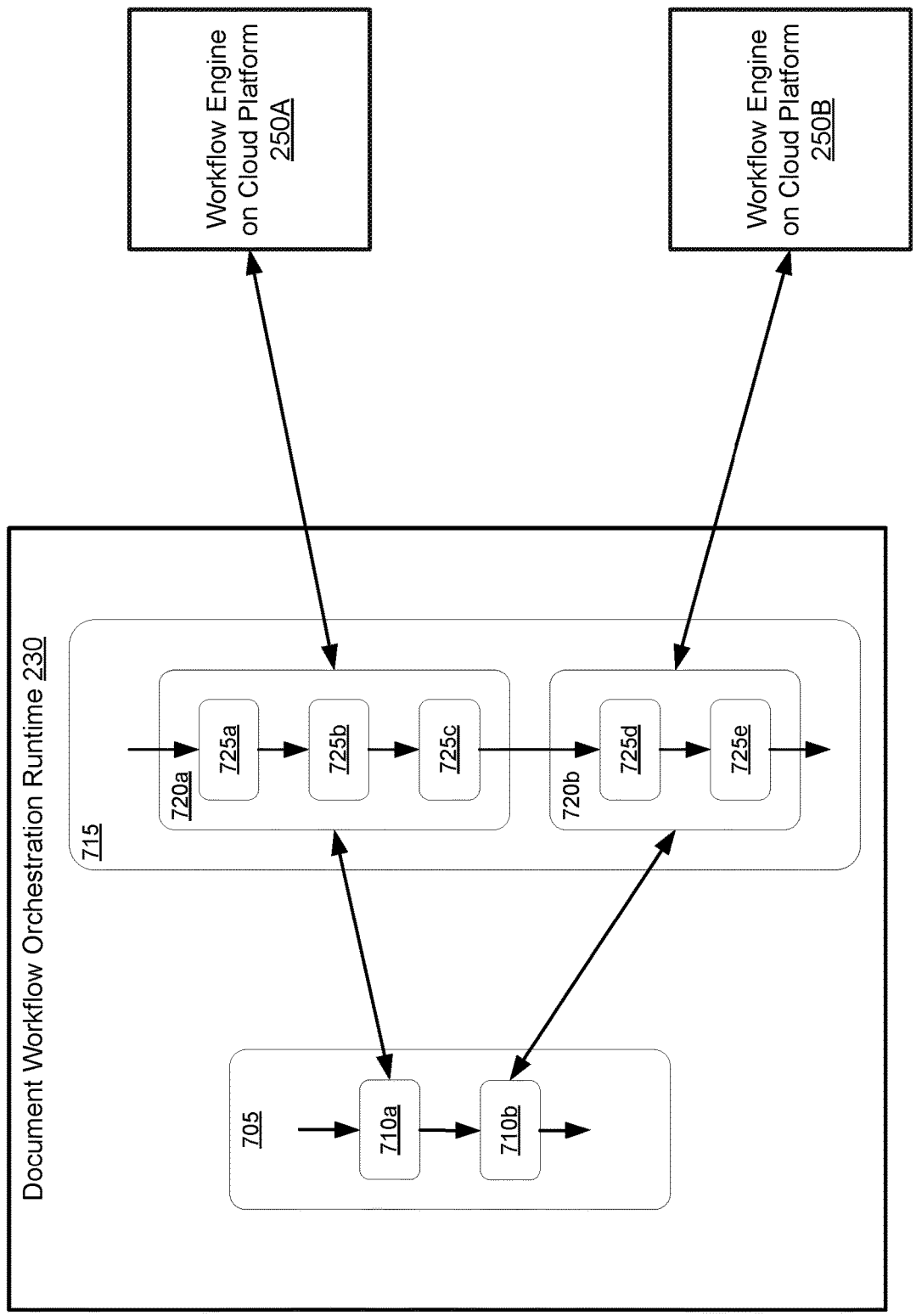
FIG. 7 is a block diagram of a system environment for a document workflow orchestration runtime executing steps of a document workflow on one or more workflow engines executing on cloud platforms, in accordance with an example embodiment.

FIG. 7 is a block diagram of a system environment for a document workflow orchestration runtime executing steps of a document workflow on one or more workflow engines executing on cloud platforms, in accordance with an example embodiment. The document workflow orchestration runtime 230 receives one or more platform independent document workflow specifications and corresponding platform specific document workflow specifications. The document workflow orchestration runtime 230 generates graph representations 705 of the platform independent document workflow specifications and graph representations 715 of the corresponding platform specific document workflow specifications. Each node of a document workflow can be a workflow itself comprising a set of nodes. Accordingly, each node of a document workflow graph 705, 715 is recursively defined as a document workflow graph.

Each node of the graph 705 of a platform independent document workflow specification is associated with a set of nodes of the corresponding graph 715 of platform specific document workflow specification. For example, node 710*a* of the graph representation 705 corresponds to the set of nodes 720*a* including nodes 725*a*, 725*b*, and 725*c*. Similarly, node 710*b* of the graph 705 corresponds to the set of nodes 720*b* including nodes 725*d*, and 725*e*. The document workflow orchestration runtime 230 maintains a mapping from nodes of the graph 705 and corresponding nodes of the graph 715 as well as the mapping in the reverse direction that maps the nodes of the graph 715 to the nodes of graph 705. According to an embodiment, the steps 710*a*, 710*b* of the graph 705 execute on one workflow engine W1 executing on a cloud platform P1 whereas the steps 725*a*, 725*b*, 725*c*, 725*d*, 725*e* of the graph 715 execute on a different workflow engine W2 executing on a different cloud platform P2.

The entire graph 715 may be executed on a single workflow engine 250 executing on cloud platform. Alternatively, one or more sets of nodes of the graph 715 may execute on a particular workflow engine executing on a cloud platform and one or more other sets of nodes of the graph 715 may execute on another workflow engine executing on the same or a different cloud platform. For example, set 720*a* of nodes of the document workflow 715 execute on the workflow engine 250A and set 720*b* of nodes of the document workflow 715 execute on the workflow engine 250B. The document workflow orchestration runtime 230 tracks the execution of the document workflow represented by the graph 715 across all the workflow engines 250A, 250B used to execute the document workflow. Accordingly, the document workflow orchestration runtime 230 sends a request for execution of one or more steps of the document workflow corresponding to graph 715 to each workflow engine assigned for executing the corresponding steps and receives the status of execution of the steps corresponding to nodes of the graph 715 from the workflow engine 250. The document workflow orchestration runtime 230 maps the status of the nodes of the graph 715 representing platform specific document workflow specification to the corresponding nodes of the graph 705 representing platform independent document workflow specification. Typically, each node of the graph 705 is mapped to one or more nodes of the graph 715.

The document workflow orchestration runtime 230 configures a user interface showing the status of execution of the document workflow based on the graph 705. Accordingly, the nodes of the graph 705 display an indication of whether the corresponding step has completed execution or is yet to be executed or partially executed (i.e., in the process of being executed currently). In an embodiment, a node currently being executed shows an indication of the amount of execution that is completed, for example, a percentage of the corresponding nodes of the graph 715 that have already been executed. For example, the node may show a numeric value indication a percentage of execution of the node that is completed. The node may show a color or shading indicating the amount of execution completed, for example, lighter color or lighter shading indicating less completion of the execution of the node compared to a darker color or darker shading. Alternatively, a node may be represented as a shape that is partially colored using a color C1 such that the remaining shape has color C2. The amount of shape that has color C1 is proportionate to the amount of execution of the node that is complete. Accordingly, initially the node has all color C2 when the node hasn't started execution. Subsequently, more and more portion of the node changes to color C1 and the portion having color C2 decreases. Finally, when the execution of the node is complete, the entire shape has color C1. Accordingly, various embodiments show the execution of each node using a visual representation.

Figure 8:
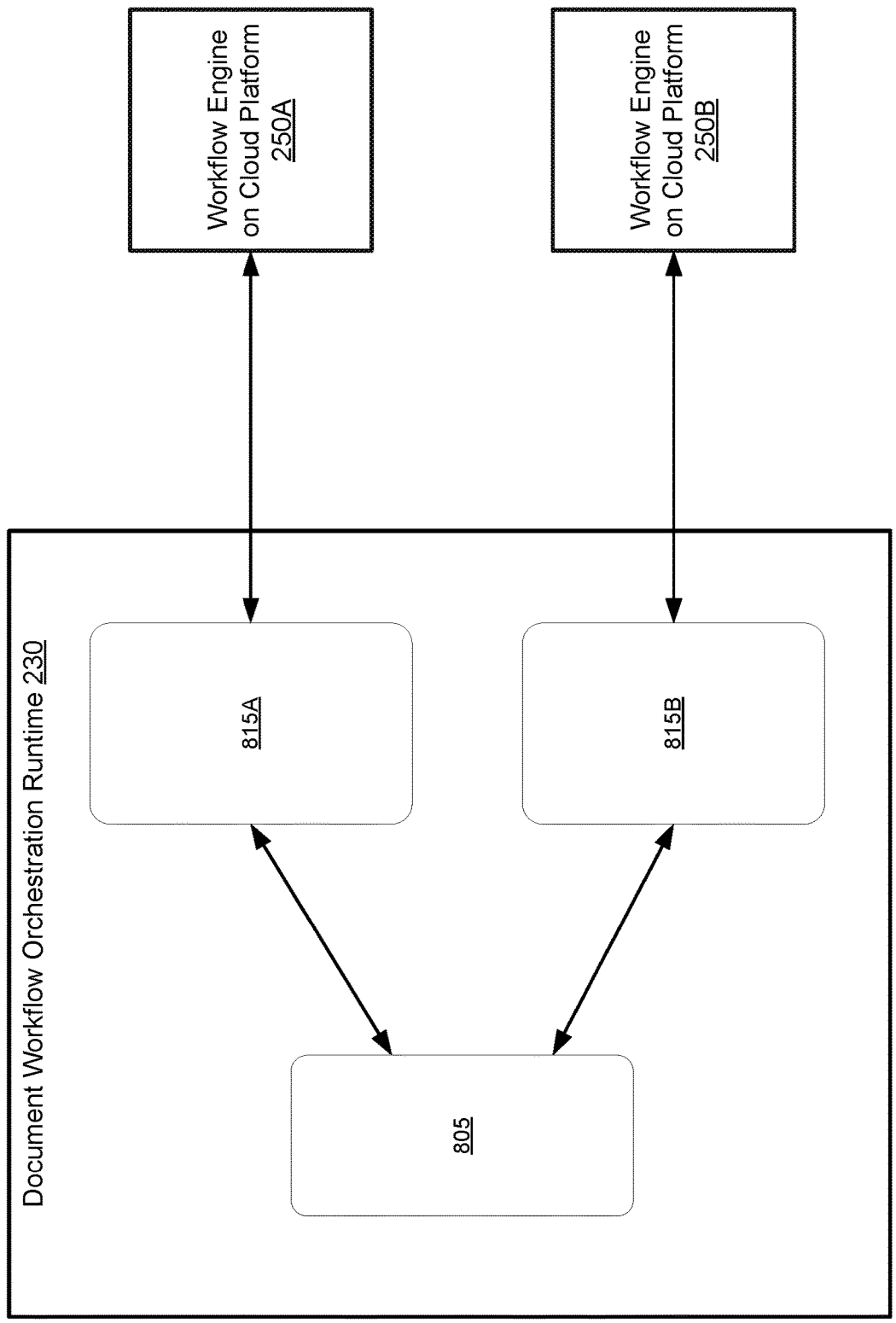
FIG. 8 is a block diagram of a system environment for a document workflow orchestration runtime executing a document workflow on workflow engines executing on cloud platforms, in accordance with an example embodiment.

FIG. 8 is a block diagram of a system environment for a document workflow orchestration runtime 230 executing a document workflow on workflow engines executing on cloud platforms, in accordance with an example embodiment. As shown in FIG. 8, the document workflow orchestration runtime 230 can generate multiple platform specific document workflow specifications 815A, 815B from the same platform independent document workflow specification 805, one for each target workflow engine 250A, 250B executing on a respective cloud platform. An organization may use two different cloud platforms for processing a document workflow using the document workflow orchestration runtime 230. For example, an organization may generate one platform specific document workflow specification for execution on a workflow engine executing on an AWS and generate another platform specific document workflow specification for execution on GCP. The document workflow orchestration runtime 230 may execute multiple instances of the same document workflow in each workflow engine. For example, once the document workflow is finalized using the platform independent document workflow specification, multiple users may execute the workflow in each workflow engine 250. According to another embodiment, different organizations may use different cloud platforms for processing document workflows. For example, one organization may execute document workflows on a workflow engine executing on an AWS and another organization may execute document workflows on a workflow engine executing on GCP. Each organization may generate their own platform independent document workflow specification and compile it to obtain a platform specific document workflow specification for execution on a workflow engine running on a particular cloud platform. The organizations may obtain platform independent document workflow specifications from a shared library and may use the same platform independent document workflow specification that is compiled for their respective cloud platforms.

Figure 9A:
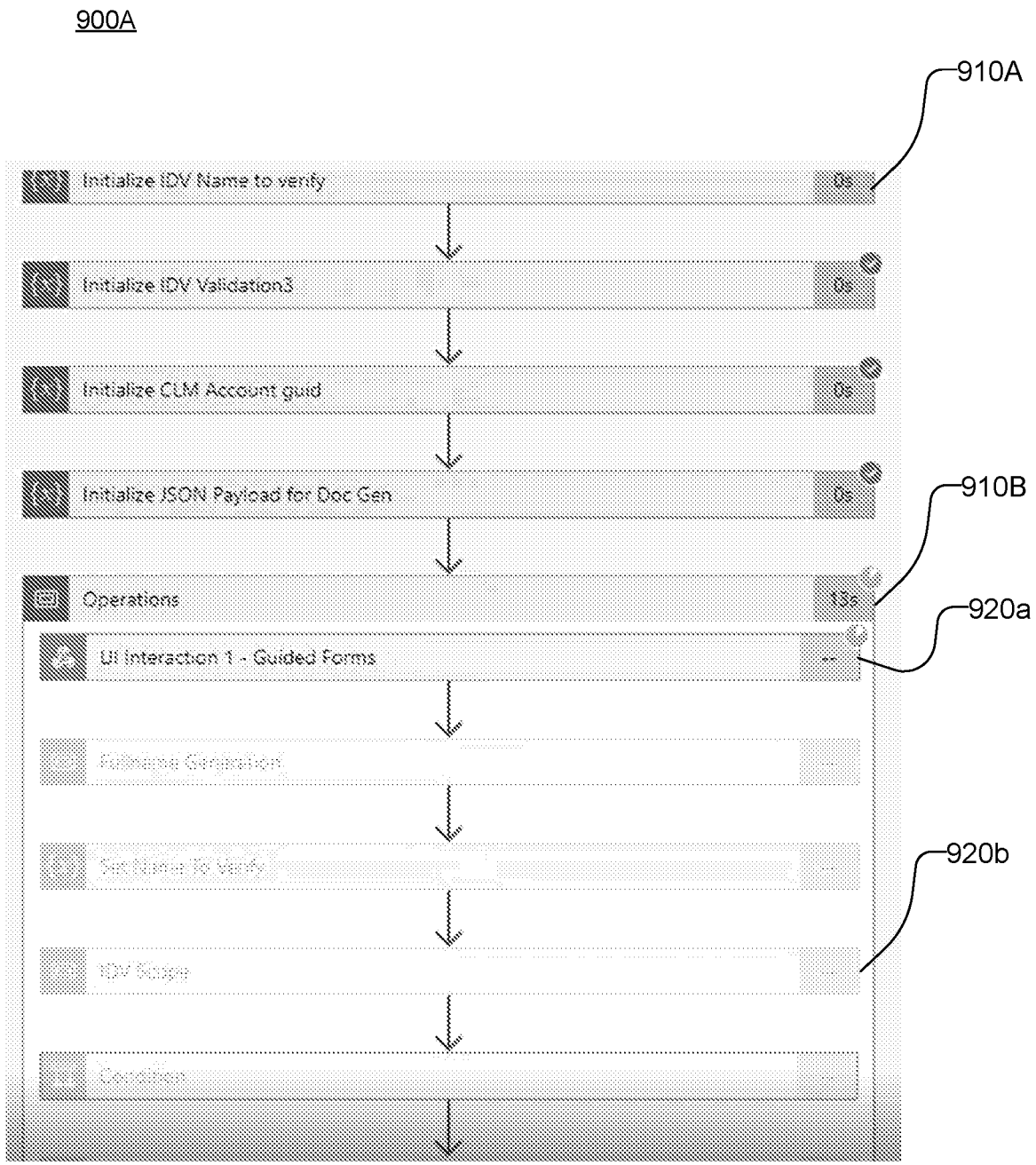
FIGS. 9A-C illustrate a user interface for monitoring a document workflow executing on one or more workflow engines executing on cloud platforms, in accordance with an example embodiment.
Figure 9B:
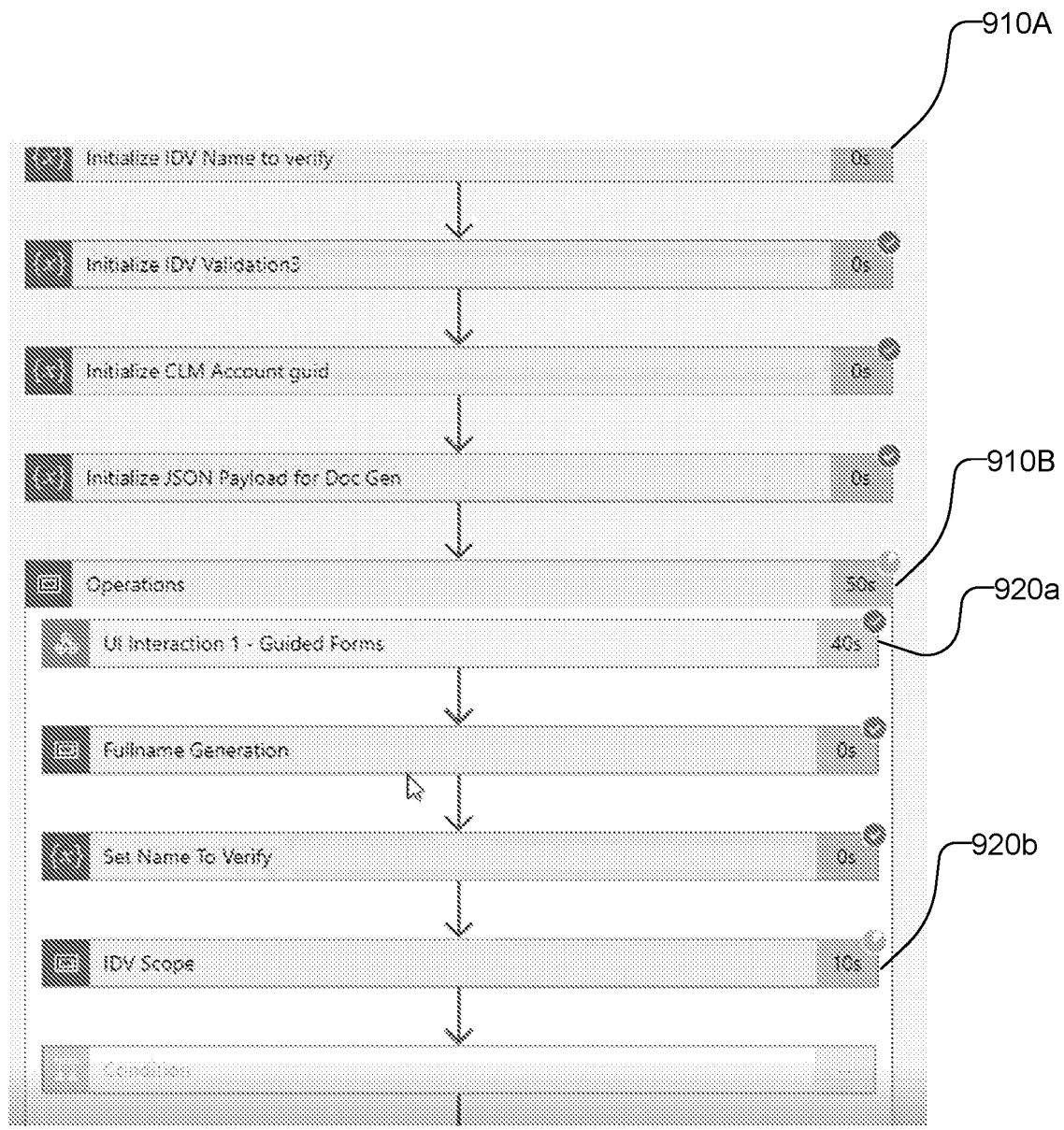
Figure 9C:
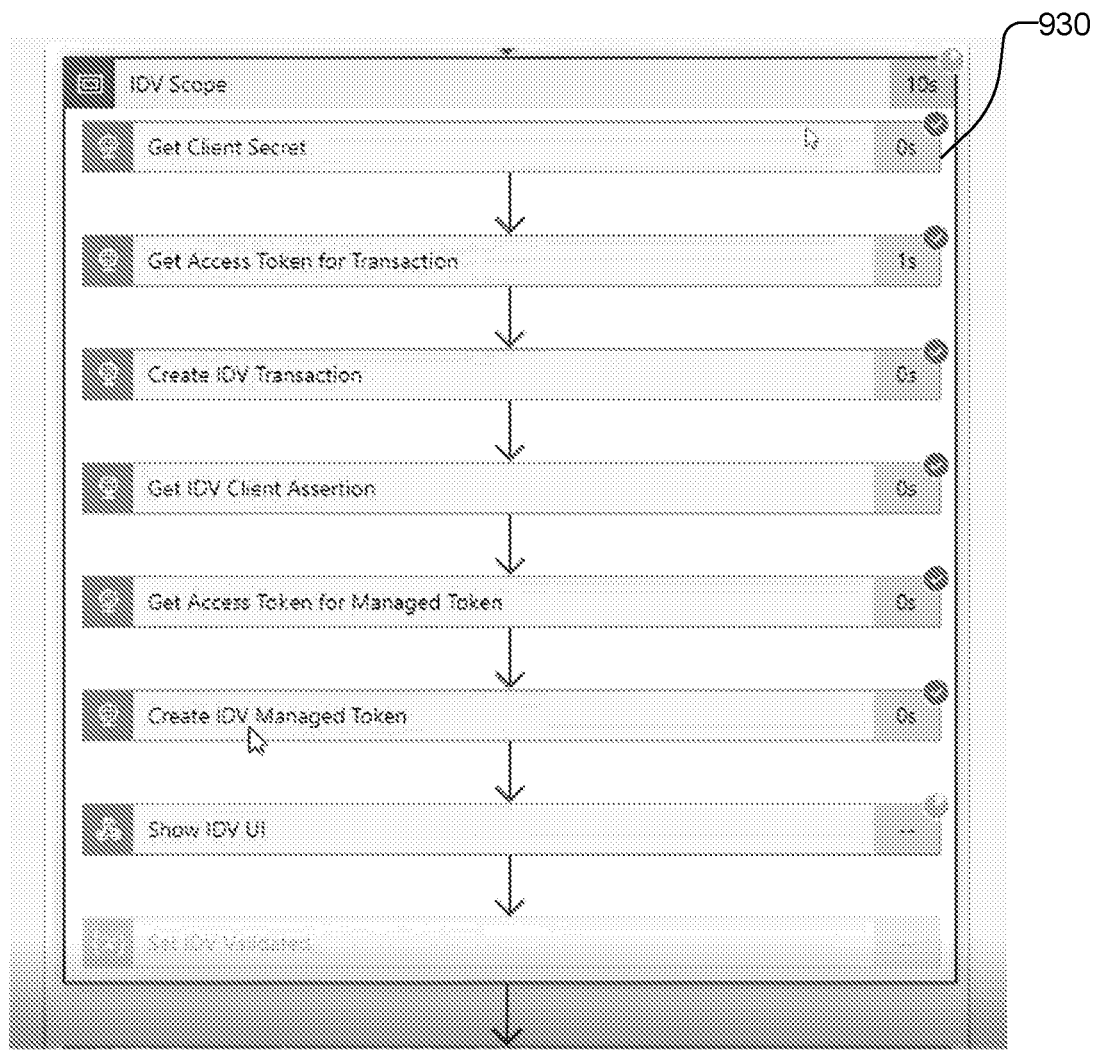

The document workflow orchestration runtime 230 monitors the execution of various instances of the document workflow based on a platform independent document workflow specification. The document workflow orchestration runtime 230 can report execution of each individual instance if the document workflow via visualization as shown in FIGS. 9A-C. The document workflow orchestration runtime 230 further collects statistics based on various instances of the document workflow executing on a plurality of workflow engines. For example, the document workflow orchestration runtime 230 determines and reports a number of instances executing of the document workflow corresponding to the platform independent document workflow specification on each workflow engine or on each cloud platform. For example, the document workflow orchestration runtime 230 may generate a histogram based on the number of instances executing on each workflow engine or each cloud platform during a particular time interval. The document workflow orchestration runtime 230 may determine the performance of individual steps of the platform independent document workflow specification on different workflow engines or on different cloud platforms. For example, the document workflow orchestration runtime 230 may report if a particular step of the platform independent document workflow specification is taking significantly longer to execute on a particular workflow engine or a particular cloud platform as compared to other workflow engines or other cloud platforms. The use of platform independent document workflow specification allows other types of analysis of individual steps of the document workflow that is independent of the workflow engine on which the document workflow is being executed, for example, by determining an aggregate execution performance of individual steps of the document workflow independent of the underlying workflow engine or cloud platform on which the step is executed; or by determining the total number of instances of the document workflow corresponding to the platform independent document workflow specification independent of the workflow engine or the cloud platform on which the instance is being executed.

FIGS. 9A-C illustrate a user interface for monitoring a document workflow executing on one or more workflow engines executing on cloud platforms, in accordance with an example embodiment. The document workflow orchestration runtime 230 configures a user interface showing a graph representation of the platform independent document workflow specification and each platform specific document workflow specification generated based on the platform independent document workflow specification. The graph representation of each type of specification is a nested graph such that each node of the graph itself can be a graph with multiple nodes and edges. The document workflow orchestration runtime 230 receive via the user interface, an indication that the user would like to expand a particular node of the graph. Accordingly, the document workflow orchestration runtime 230 accesses the graph representation of the node itself and displays as user interface 900A. For example, FIG. 9A shows one or more nodes 910A, 910B of the graph. The user interface 900A shows an expanded version of the node 910B that is represented as a graph of a document workflow representing steps 920a, 920b, . . . performed to execute the step 910B. The visual representation of the steps that have completed execution is different from the visual representation of steps that have not yet been executed. For example, the visual representation of step 920a that has completed execution is different from visual representation of step 920b that has not been executed. For example, a step that has been executed may be shown using darker color or shading compared to a step that has not yet been executed. As shown in the screenshot of the user interface 900B illustrated in FIG. 9B, the visual representation of a step changes once the step is executed. For example, the visual representation of the step 920b changes as the step 920b is executed compared to the visualization of step 920b shown in user interface 900A. The nodes of the subgraph representation of each node (e.g., node 910b) itself can be a graph. For example, if the user requests to expand the node corresponding to step 920B, the subgraph representation of node 920b as shown in screenshot of the user interface 900C of FIG. 9C is displayed. The document workflow orchestration runtime 230 tracks the status of execution of the document workflow to any depth of subgraph representations and maps the status to nodes at higher levels of representation of the graph al the way to the graph representation of the platform independent document workflow specification.

Figure 10:
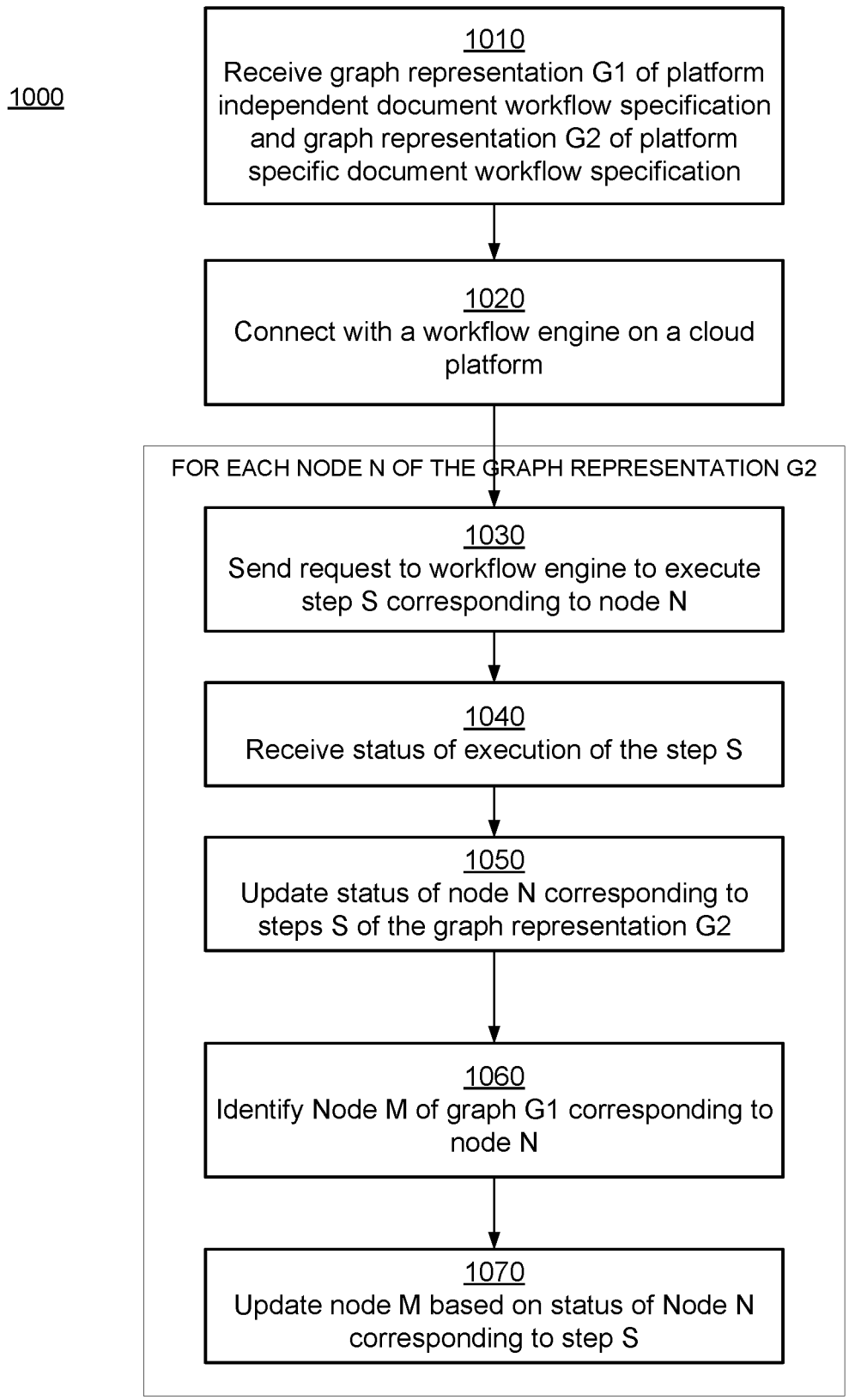
FIG. 10 illustrates a process for monitoring execution of a document workflow on one or more workflow engines executing on cloud platforms, in accordance with an example embodiment.

FIG. 10 illustrates a process for monitoring execution of a document workflow on one or more workflow engines executing on cloud platforms, in accordance with an example embodiment. The document workflow orchestration runtime 230 either receives 1010 or generates a graph representation G1 of a platform independent document workflow specification and one or more graph representations G2 for a platform specific document workflow specification, e.g., graph representations G2a, G2b, G2c, corresponding to different workflow engines executing on different cloud platforms. For a particular graph representation G2 generated for a workflow engine of a particular type configured for execution on a particular cloud platform, the document workflow orchestration runtime 230 connects 1020 with an instance of the type of workflow engine executing on the particular cloud platform.

For each node N of the graph representation G2, the document workflow orchestration runtime 230 performs steps 1030, 1040, 1050, 1060, and 1070 as shown in the flowchart 1000. The document workflow orchestration runtime 230 sends one or more requests to the workflow engine to execute the step S of the document workflow corresponding to the node N. Since the step S itself may comprise a set of steps (also referred to herein as sub-steps), each sub-step may require invocation of an API of the workflow engine. The document workflow orchestration runtime 230 receives 1040 status of execution of the step S. If the step S comprises a plurality of sub-steps, the document workflow orchestration runtime 230 receives 1040 execution status of each sub-step and determines the execution status of step S based on the status of the individual sub-steps. The document workflow orchestration runtime 230 updates 1050 the status of node N based on the status of execution of the step S of graph G2 received from the workflow engine.

The document workflow orchestration runtime 230 further accesses a mapping from nodes of the graph G2 to nodes of the graph G1 and identifies 1060 a node M of the graph G1 corresponding to the node N of graph G2. The document workflow orchestration runtime 230 updates the status of the node M based on the status of the node N.

The document workflow orchestration runtime 230 may generate multiple platform specific document workflow specification corresponding to each of a plurality of workflow engines and therefore generate multiple graph G2 representations corresponding to each multiple platform specific document workflow representation. The document workflow orchestration runtime 230 may connect with each of the workflow engines of the corresponding platform and execute the different platform specific document workflow specifications concurrently. Furthermore, for each workflow engine, the document workflow orchestration runtime 230 may execute multiple instances of document workflow based on corresponding platform specific document workflow specification, for example, one instance for each user. The document workflow orchestration runtime 230 receives status from each of these execution instances and updates the corresponding status of execution of the instances of nodes of platform independent document workflow specification.

The document workflow orchestration runtime 230 may aggregate statistical information for the document workflow. The document workflow orchestration runtime 230 may generate aggregate statistics for the platform independent document workflow specification that is aggregated across a plurality of workflow engines, each running on a different cloud platform, for example, total number of instances of the document workflow executing across all the workflow engines and across all the cloud platforms. The document workflow orchestration runtime 230 may generate aggregate statistics for the platform independent document workflow specification that is aggregated across a specific workflow engine running on a particular cloud platform, for example, total number of instances of the document workflow executing on that workflow engine and on that particular cloud platform. The document workflow orchestration runtime 230 may generate aggregate statistics for individual steps of the platform independent document workflow specification that is aggregated across the plurality of workflow engines, each running on a different cloud platform, for example, average execution time of the across all the workflow engines or across all the cloud platforms. The document workflow orchestration runtime 230 may generate aggregate statistics for individual steps of the platform independent document workflow specification that is aggregated across a specific workflow engine running on a particular cloud platform, for example, average execution time of the step of the document workflow executing on that workflow engine and on that particular cloud platform (or create a histogram across various workflow engines).

The document workflow orchestration runtime 230 may generate statistics for platform specific document workflow specification that is specific to the workflow engine and cloud platform, for example, total number of instances of the document workflow executing on the workflow engine, execution time of individual steps on the workflow engine, and so on. The statistics generated for each platform specific document workflow specification are aggregated to obtain statistics for platform independent document workflow specification.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method of monitoring execution of one or more document workflows, the computer-implemented method comprising:
receiving a platform independent document workflow specification comprising a sequence of steps associated with one or more documents, the platform independent document workflow specification specifying a document workflow configured for execution on any of a plurality of workflow engines, each workflow engine of the plurality of workflow engines executing on a distinct cloud platform;
compiling the platform independent document workflow specification to generate a platform specific document workflow specification configured for execution on a target workflow engine executing on a target cloud platform, wherein the compiling comprises generating, based on a particular step of the platform independent document workflow specification and the target workflow engine, a plurality of steps of the platform specific document workflow specification and a mapping of the plurality of steps of the platform specific document workflow specification to the particular step of the platform independent document workflow specification;
executing the platform specific document workflow specification on the target workflow engine of the target cloud platform; and
monitoring execution of the platform specific document workflow specification on the target workflow engine wherein the monitoring comprises determining, using the mapping, a status of execution of the particular step of the platform independent document workflow specification based on a status of execution of a step of the plurality of steps of the platform specific document workflow specification.

2. The computer-implemented method of claim 1, further comprising:
configuring for display, a user interface showing a graph representing the platform independent document workflow specification, wherein a step of the platform independent document workflow specification is represented as a node, wherein a status of a node indicates whether the step corresponding to the node has completed execution, not yet executed, or currently being executed.

3. The computer-implemented method of claim 2, wherein
the status of a node corresponding to the particular step is indicated as having completed execution if all steps of the plurality of steps have completed execution,
the status of the node corresponding to the particular step is indicated as not yet executed if all steps of the plurality of steps have not yet executed, and
the status of the node corresponding to the particular step is indicated as currently executing if a first subset of the plurality of steps has completed execution and a second subset of the plurality of steps is not yet executed.

4. The computer-implemented method of claim 2, wherein the graph representing the platform independent document workflow specification corresponds to a particular instance of the document workflow based on the platform independent document workflow specification, the particular instance of the document workflow executing on one or more workflow engines of the plurality of workflow engines, the particular instance of the document workflow associated with one or more users.

5. The computer-implemented method of claim 1, further comprising:
configuring for display, a user interface showing a graph representing the platform independent document workflow specification, wherein a step of the platform independent document workflow specification is represented as a node, wherein the node indicates statistical information describing a plurality of instances of document workflows based on the platform independent document workflow specification.

6. The computer-implemented method of claim 5, wherein the statistical information describing the plurality of instances of document workflows based on the platform independent document workflow specification associated with a node represents an aggregate execution time of the step corresponding to the node across the plurality of instances of document workflows.

7. The computer-implemented method of claim 1, further comprising:
configuring for display, a user interface showing statistical information describing execution of instances of document workflows based on the platform independent document workflow specification, the statistical information aggregating data for each of the plurality of workflow engines.

8. The computer-implemented method of claim 1, wherein the document workflow includes one or more of: a document signing step, an identity verification step, or a step for configuring and presenting a form for receiving information.

9. Non-transitory computer-readable storage media storing instructions that, when executed, cause one or more processors to:
receive a platform independent document workflow specification comprising a sequence of steps associated with one or more documents, the platform independent document workflow specification specifying a document workflow configured for execution on any of a plurality of workflow engines, each workflow engine of the plurality of workflow engines executing on a distinct cloud platform;
compile the platform independent document workflow specification to generate a platform specific document workflow specification configured for execution on a target workflow engine executing on a target cloud platform, wherein to compile, the instructions cause the one or more processors to generate, based on a particular step of the platform independent document workflow specification and the target workflow engine, a plurality of steps of the platform specific document workflow specification and a mapping of the plurality of steps of the platform specific document workflow specification to the particular step of the platform independent document workflow specification;

execute the platform specific document workflow specification on the target workflow engine of the target cloud platform; and monitor execution of the platform specific document workflow specification on the target workflow engine wherein to monitor, the instructions cause the one or more processors to determine, using the mapping, a status of execution of the particular step of the platform independent document workflow specification based on a status of execution of a step of the plurality of steps of the platform specific document workflow specification.

10. The non-transitory computer-readable storage media of claim 9, wherein the instructions further cause the one or more processors to:

configure for display, a user interface showing a graph representing the platform independent document workflow specification, wherein a step of the platform independent document workflow specification is represented as a node, wherein a status of a node indicates whether the step corresponding to the node has completed execution, not yet executed, or currently being executed.

11. The non-transitory computer-readable storage media of claim 10, wherein:

the status of a node corresponding to the particular step is indicated as having completed execution if all steps of the plurality of steps have completed execution, the status of the node corresponding to the particular step is indicated as not yet executed if all steps of the plurality of steps have not yet executed, and the status of the node corresponding to the particular step is indicated as currently executing if a first subset of the plurality of steps has completed execution and a second subset of the plurality of steps is not yet executed.

12. The non-transitory computer-readable storage media of claim 10, wherein the graph representing the platform independent document workflow specification corresponds to a particular instance of the document workflow based on the platform independent document workflow specification, the particular instance of the document workflow executing on one or more workflow engines of the plurality of workflow engines, the particular instance of the document workflow associated with one or more users.

13. The non-transitory computer-readable storage media of claim 9, wherein the instructions further cause the one or more processors to:

configure for display, a user interface showing a graph representing the platform independent document workflow specification, wherein a step of the platform independent document workflow specification is represented as a node, wherein the node indicates statistical information describing a plurality of instances of document workflows based on the platform independent document workflow specification.

14. The non-transitory computer-readable storage media of claim 13, wherein the statistical information describing the plurality of instances of document workflows based on the platform independent document workflow specification associated with a node represents an aggregate execution time of the step corresponding to the node across the plurality of instances of document workflows.

15. The non-transitory computer-readable storage media of claim 9, wherein the instructions further cause the one or more processors to:

configure for display, a user interface showing statistical information describing execution of instances of document workflows based on the platform independent document workflow specification, the statistical information aggregating data for each of the plurality of workflow engines.

16. The non-transitory computer-readable storage media of claim 9, wherein the document workflow includes one or more of: a document signing step, an identity verification step, or a step for configuring and presenting a form for receiving information.

17. A system comprising:

one or more processors; and non-transitory computer-readable storage media storing instructions that, when executed, cause the one or more processors to:

receive a platform independent document workflow specification comprising a sequence of steps associated with one or more documents, the platform independent document workflow specification specifying a document workflow configured for execution on any of a plurality of workflow engines, each workflow engine of the plurality of workflow engines executing on a distinct cloud platform;

compile the platform independent document workflow specification to generate a platform specific document workflow specification configured for execution on a target workflow engine executing on a target cloud platform, wherein to compile, the instructions cause the one or more processors to generate, based on a particular step of the platform independent document workflow specification and the target workflow engine, a plurality of steps of the platform specific document workflow specification and a mapping of the plurality of steps of the platform specific document workflow specification to the particular step of the platform independent document workflow specification;

execute the platform specific document workflow specification on the target workflow engine of the target cloud platform; and monitor execution of the platform specific document workflow specification on the target workflow engine wherein to monitor, the instructions cause the one or more processors to determine, using the mapping, a status of execution of the particular step of the platform independent document workflow specification based on a status of execution of a step of the plurality of steps of the platform specific document workflow specification.

18. The system of claim 17, wherein the instructions further cause the one or more processors to perform steps comprising:

configure for display, a user interface showing a graph representing the platform independent document workflow specification, wherein a step of the platform independent document workflow specification is represented as a node, wherein a status of a node indicates whether the step corresponding to the node has completed execution, not yet executed, or currently being executed.

19. The system of claim 18, wherein:
the status of a node corresponding to the particular step is indicated as having completed execution if all steps of the plurality of steps have completed execution,
the status of the node corresponding to the particular step is indicated as not yet executed if all steps of the plurality of steps have not yet executed, and
the status of the node corresponding to the particular step is indicated as currently executing if a first subset of the plurality of steps has completed execution and a second subset of the plurality of steps is not yet executed.

20. The system of claim 17, wherein the executable instructions further cause the one or more processors to:
configure for display, a user interface showing a graph representing the platform independent document workflow specification, wherein a step of the platform independent document workflow specification is represented as a node, wherein the node indicates statistical information describing a plurality of instances of document workflows based on the platform independent document workflow specification.

* * * * *